United States Patent
Jacobs et al.

[11] Patent Number: 6,125,096
[45] Date of Patent: Sep. 26, 2000

[54] DYNAMIC/STATIONARY TAPE GUIDE

[75] Inventors: Lynn C. Jacobs, Longmont; David T. Hoge, Westminster, both of Colo.

[73] Assignee: Stomage Technology Comporation, Louisville, Colo.

[21] Appl. No.: 09/057,128

[22] Filed: Apr. 8, 1998

[51] Int. Cl.[7] .............................. G11B 23/02; B65H 27/00
[52] U.S. Cl. ........................... 369/259; 360/132; 242/346
[58] Field of Search ................................ 360/130.21, 132; 369/259; 242/342, 346, 340

[56] References Cited

U.S. PATENT DOCUMENTS

| | | |
|---|---|---|
| 3,276,651 | 10/1966 | Bryer . |
| 3,327,964 | 6/1967 | Nussbaumer . |
| 3,360,174 | 12/1967 | Evert . |
| 3,991,956 | 11/1976 | Machida . |
| 4,071,177 | 1/1978 | Burdorf . |
| 4,144,991 | 3/1979 | Eddy . |
| 4,276,575 | 6/1981 | Schoettle et al. . |
| 4,341,335 | 7/1982 | Schmid . |
| 4,403,720 | 9/1983 | Grant ........................................ 226/190 |
| 4,456,160 | 6/1984 | Schoettle et al. ........................ 226/195 |
| 4,633,347 | 12/1986 | Higgins . |
| 5,114,245 | 5/1992 | Tanaka et al. ............................ 384/112 |
| 5,173,828 | 12/1992 | Tanzer et al. ....................... 360/130.21 |
| 5,282,105 | 1/1994 | Eaton et al. . |
| 5,289,331 | 2/1994 | Eaton et al. . |
| 5,296,994 | 3/1994 | Katohno et al. .................... 360/130.21 |
| 5,299,756 | 4/1994 | Hu et al. ............................... 242/346.1 |
| 5,367,471 | 11/1994 | Nguyen et al. . |
| 5,453,895 | 9/1995 | Kaneda et al. ..................... 360/130.21 |
| 5,563,755 | 10/1996 | Kawakami et al. . |

*Primary Examiner*—David L. Ometz
*Assistant Examiner*—Angel Castro
*Attorney, Agent, or Firm*—Brooks & Kushman P.C.

[57] ABSTRACT

A tape guide in a tape cartridge for use with a tape drive includes a fixed shaft and a cylindrical sleeve positioned around the shaft. The sleeve has an inner surface and an outer surface. The inner surface of the sleeve engages the shaft such that there is friction between the sleeve and the shaft. This friction is overcome by friction between tape and the outer surface of the sleeve when the tape engages the outer surface of the sleeve causing the sleeve to rotate around the shaft as the tape moves. The friction between the tape and the outer surface of the shaft decreases below the friction between the sleeve and the shaft once the tape moves at a velocity sufficient to develop an air film between the tape and the outer surface of the sleeve causing the sleeve to cease rotation around the shaft.

4 Claims, 2 Drawing Sheets

DYNAMIC/STATIONARY TAPE GUIDE

TECHNICAL FIELD

The present invention relates generally to tape guides for guiding tape in a tape drive and, more particularly, to a tape guide for reducing tape stiction.

BACKGROUND ART

Web and tape guiding apparatus guide magnetic or optical tape over a read/write head. Guiding the tape over the head is critical to the writing of data to and the reading of data from the tape. A typical magnetic tape drive includes several elements in the tape path to ensure proper alignment and operation of the tape and the head. For example, the tape path of a typical tape drive may include a supply reel, a vibration decoupler, a cleaner blade, a magnetic read/write head, a tension transducer, a storage reel, and tape guides.

The tape guides physically align the lateral position (i.e., in the direction of the tape width) of the tape relative to the read/write head. Lateral positioning maintains proper alignment between the read/write elements of the head and the data tracks on the tape. The tape guides also support and guide the tape in its easy direction of bending (i.e., in the direction of tape travel).

Three basic types of guides are known for easy direction tape guiding. The first guide type is a fixed cylindrical post. A fixed cylindrical post is based on theory that a hydrodynamic film of air forms between the tape and the post when the tape is in motion, thereby reducing friction and wear. However, practically sized posts fail to produce an air film of sufficient thickness to reduce friction and wear to a significant extent. Also, when the tape is stopped and rests on the post under tension it sticks to the post. Such stiction makes the initiation of tape movement difficult and may result in damage to the tape or tape drive failure due to the inability of the tape drive to start tape motion. Stiction is especially a problem with posts in hot and wet environments.

The second guide type is a roller. As compared to posts, rollers reduce friction with a tape in motion and stiction with a tape at rest because rollers are always rotating while a tape is in motion. However, rollers introduce vibration into the tape path (which may disrupt the head-tape interface). Also, rollers store energy that must be positively controlled to maintain adequate closed loop tension control. Rollers steer tape differently than do posts, and often require grooves or other geometries to prevent the tape from flying over and above them. Further, rollers employ expensive ball bearings.

The third guide type is an externally pressurized air bearing. Although an air bearing can dramatically reduce tape friction and stiction, it is more complex and expensive than a post or roller. An air bearing is complex because it requires the space and parts for air to be provided under controlled pressure.

Examples of fixed cylindrical posts and/or rollers are disclosed in U.S. Pat. Nos. 4,633,347, 4,341,335, 4,144,991, 3,991,956, 3,360,174, 3,276,651, and 3,327,964. To the extent that these references disclose the guiding of tapes, the posts and/or rollers are used to drive tape movement, control tape tension, or provide lateral tape guiding. Also, U.S. Pat. No. 4,071,177 discloses air bearings and U.S. Pat. No. 4,276,575 discloses the use of a plastic lubricant on a tape guide to reduce friction. Examples of other guides are shown in U.S. Pat. Nos. 5,289,331 and 5,282,105.

What is needed is a tape guide that has the advantages associated with fixed cylindrical posts and rollers without the disadvantages associated with these types of tape guides.

SUMMARY OF THE INVENTION

Accordingly, it is an object of the present invention to provide a tape guide which is rotatable during starting and stopping of a tape engaging the tape guide and is fixed when the tape has a velocity which causes a hydrodynamic air film to develop and separate the tape and the tape guide.

In carrying out the above object and other objects, the present invention provides a tape guide including a fixed shaft and a cylindrical sleeve positioned around the shaft. The inner surface of the sleeve engages the shaft such that there is a given amount of friction between the sleeve and the shaft. The given amount of friction between the sleeve and the shaft is overcome by a given amount of friction between tape and the outer surface of the sleeve when the tape engages the outer surface of the sleeve causing the sleeve to rotate around the shaft as the tape moves.

The given amount of friction between the tape and the outer surface of the sleeve decreases below the given amount of friction between the sleeve and the shaft once the tape moves at a velocity sufficient to develop an air film between the tape and the outer surface of the sleeve causing the sleeve to cease rotation around the shaft.

In accordance with the tape guide of the present invention, a tape cartridge, and a tape drive are also provided.

The advantages accruing to the present invention are numerous. The tape guide of the present invention greatly reduces stiction of the tape on the tape guide during starting and stopping of the tape. As a result, there is no scuffing or skidding of the tape during take off and landing of the tape on the tape guide.

These and other features, aspects, and embodiments of the present invention will become better understood with regard to the following description, appended claims, and accompanying drawings.

BEST MODES FOR CARRYING OUT THE INVENTION

Figure 2:
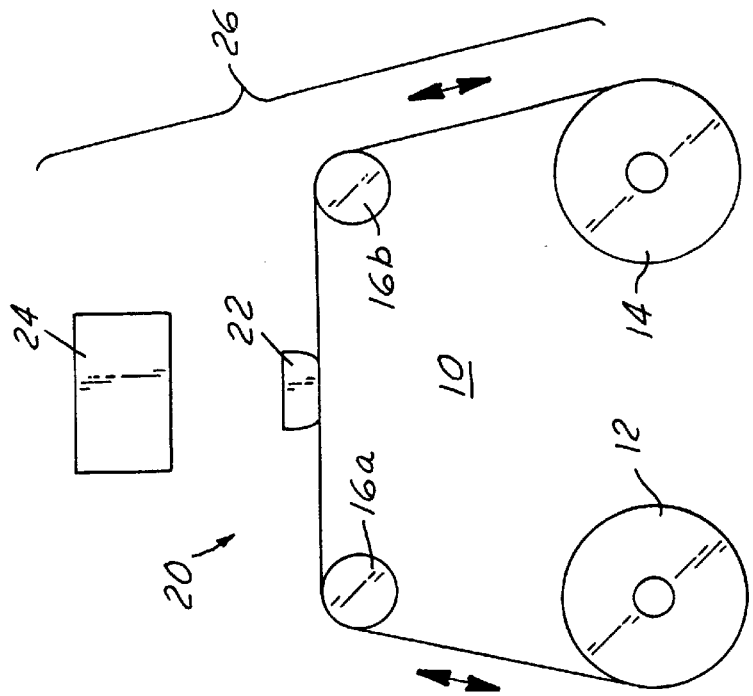
FIG. 2 is a schematic diagram of a tape drive in accordance with the present invention.

Referring now to the drawings, like numerals denote like features and structural elements in the various figures. The tape guide of the present invention will be described as embodied in a tape cartridge for use with a magnetic tape drive.

Figure 1:
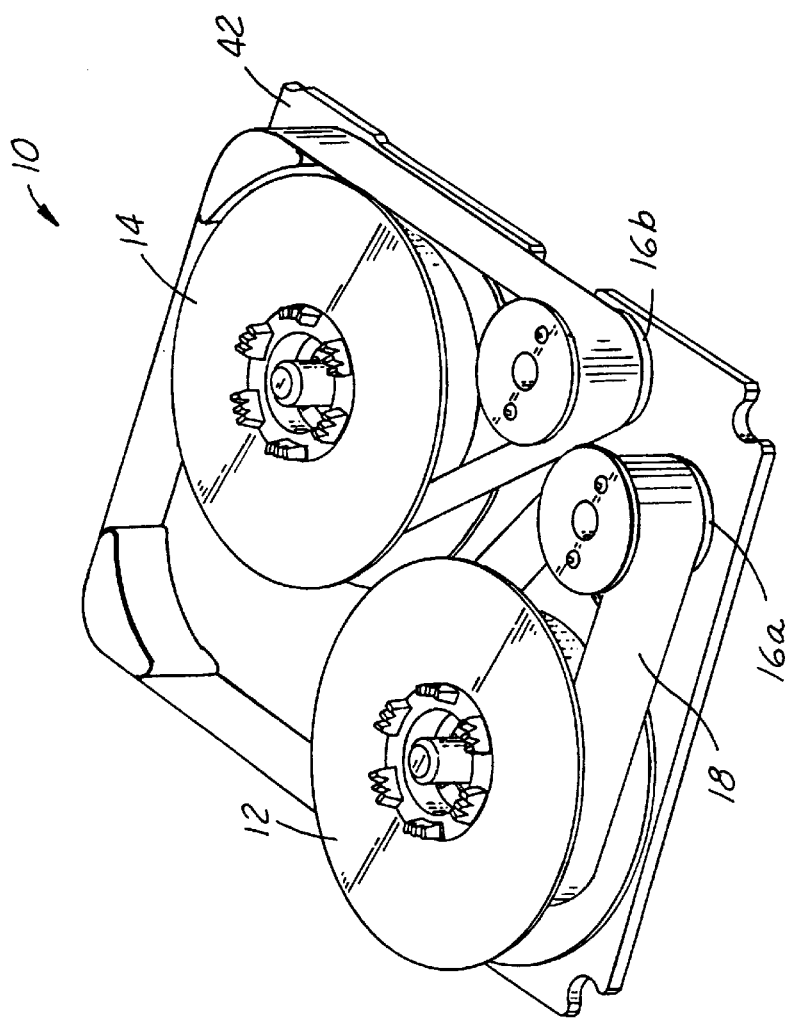
FIG. 1 is a perspective view of a tape cartridge in accordance with the present invention.

Referring now to FIG. 1, a tape cartridge 10 in accordance with the present invention is shown. Tape cartridge 10 includes a supply reel 12, a takeup reel 14, and tape guides 16(a–b). Magnetic tape 18 is wound at one end upon supply reel 12 and at the other end upon takeup reel 14. Tape guides 16(a–b) guide magnetic tape 18 from supply reel 12 to a read/write head of a tape drive (not shown in FIG. 1) to takeup reel 14. Magnetic tape 18 is shown bent in its easy direction around, and in close proximity to, tape guides 16(a–b).

Referring now to FIG. 2, a tape drive 20 in accordance with the present invention is shown. Tape drive 20 includes a read/write head 22 mounted in the tape drive. Tape cartridge 10 is inserted in tape drive 20. Tape drive 20 mechanically drives reels 12 and 14 in either direction, as required to position the desired portion of magnetic tape 18 in close proximity to read/write head 22. Read/write head 22 includes one or more magnetic transducers capable of magnetically writing data to and/or reading data from magnetic tape 18. The operation of reels 12 and 14 and read/write head 22 is managed by a controller 24 to controllably write data to and/or read data from magnetic tape 18.

Data (including analog or digitally encoded audio, visual, or any computer related data) is recorded in one or more tracks on magnetic tape 18 using any available recording format. Tape guides 16(a–b) maintain the position of magnetic tape 18 along a tape path 26. Tape guides 16(a–b) are positioned on tape cartridge 10 to maximize their utility along tape path 26.

Figure 4:
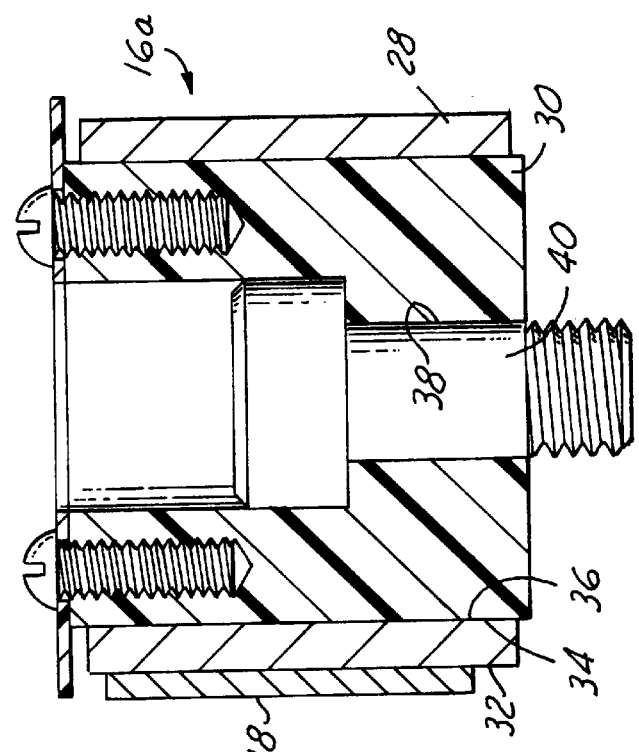
FIG. 4 is a cross sectional view of the tape guide of the present invention shown engaging tape at rest.
Figure 3:
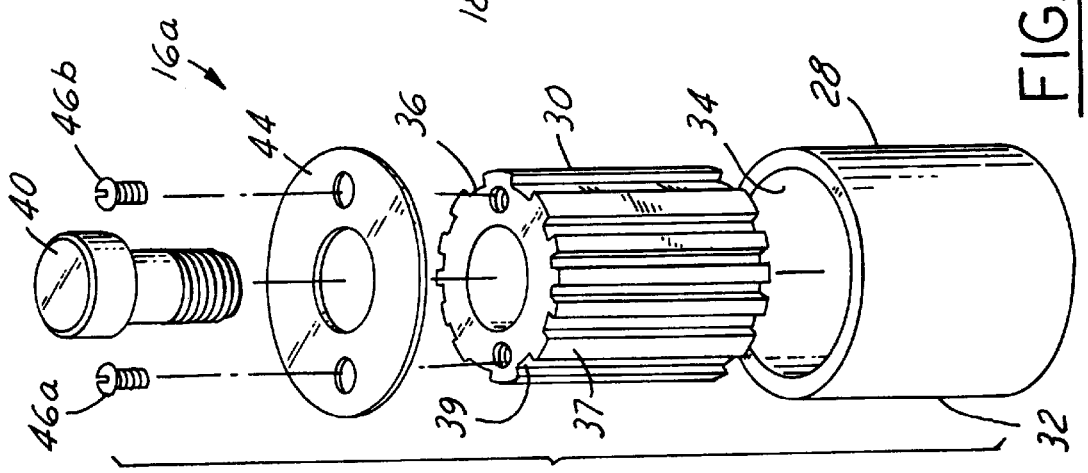
FIG. 3 is an exploded perspective view of the tape guide of the present invention.

Referring now to FIGS. 3 and 4, tape guide 16a is shown in greater detail. Tape guide 16b includes identical structure and will not be discussed further. Tape guide 16a includes a cylindrical metal sleeve 28 which fits over a cylindrical plastic shaft 30. Sleeve 28 has an outer tape engaging surface 32 and an inner shaft engaging surface 34. Tape engaging surface 32 of sleeve 28 engages magnetic tape 18 to guide the tape along tape path 26. Shaft engaging surface 34 of sleeve 28 engages an outer surface 36 of shaft 30. Sleeve 28 is rotatable around shaft 30.

Shaft 30 is a low frictional material made from plastic and designed for molding and tight tolerances. Outer surface 36 of shaft 30 includes tapers 37 and grooves 39. Tapers 37 enable shaft 30 to be removed from a mold. Grooves 39 collect debris generated as sleeve 28 rotates around shaft 30 to ensure that the debris does not interfere with the rotation of the sleeve around the shaft.

Shaft 30 has a fastening aperture 38 for receiving a fastener 40. Fastener 40 fastens shaft 30 to tape cartridge platform 42 such that tape guide 16a remains fixed in position as shown in FIG. 1. Tape guide 16a further includes a spacer element 44 which fits on top of sleeve 28 and shaft 30. Spacer element 44 is fastened to top portion of shaft 30 by a pair of fasteners 46(a–b).

Figure 5A:
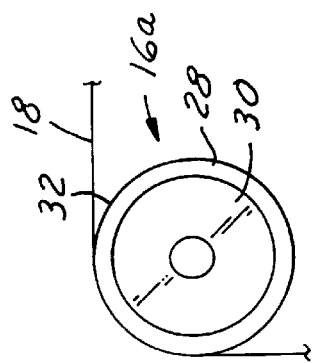
FIG. 5A is a view of the tape guide and the tape during starting and stopping of the motion of the tape.
Figure 5B:
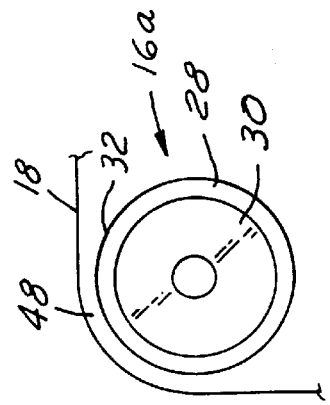
FIG. 5B is a view of the tape guide and the tape as the tape flies over the tape guide when the tape is in motion.

Referring now to FIGS. 5A and 5B with continual reference to FIGS. 3 and 4, the operation of tape guide 16a will be described. As shown in FIG. 5A, magnetic tape 18 engages tape engaging surface 32 of sleeve 28 when the tape is at rest. When magnetic tape 18 is in motion, a hydrodynamic film of air, generally designated as reference numeral 48 in FIG. 5B, forms and separates the tape and tape engaging surface 32 of sleeve 28. Air film 48 reduces friction and wear. The thickness (t) of air film 48 separating magnetic tape 18 and tape engaging surface 32 of sleeve 28 is given approximately by:

$$t = 0.426 * R * (12 n V w/T)^{2/3},$$

where n is the absolute viscosity of air, V is the winding speed, w is the width of magnetic tape 18, T is the winding tension, and R is the radius of tape engaging surface 32 of sleeve 28.

During motion start up (i.e., acceleration) of magnetic tape 18, the tape engages tape engaging surface 32 of sleeve 28 and frictionally drives the sleeve around shaft 30. Magnetic tape 18 drags sleeve 28 around shaft 30 because the tape has not yet reached a sufficient velocity to develop an air film separating the tape and the sleeve. During motion start up, there is a high amount of friction between magnetic tape 18 and tape engaging surface 32 of sleeve 28. As a result, magnetic tape 18 and sleeve 28 move together at the same velocity and there is no relative motion between them during motion start up, and there is no stiction. In effect, during motion start up, tape guide 16a is dynamic and functions like a typical roller guide with all of the associated advantages thereof.

Once magnetic tape 18 reaches the sufficient velocity, for instance when tape drive 20 drives reel 14 at a velocity of at least ½ meter per second, an air film having a sufficient thickness to separate the tape from sleeve 28 develops. At this point, friction between magnetic tape 18 and tape engaging surface 32 of sleeve 28 lessens and the tape ceases to drag the sleeve. Sleeve 28 then stops rotating around shaft 30 because the friction between shaft engaging surface 34 of the sleeve and outer surface 36 of shaft 30 is greater than the friction between magnetic tape 18 and tape engaging surface 32 of the sleeve.

In effect, once magnetic tape 18 reaches a sufficient velocity to generate an air film having a sufficient thickness to separate the tape and sleeve 28, tape guide 16a is stationary and functions like a typical fixed cylindrical post with all of the associated advantages thereof.

As magnetic tape 18 is driven at a faster velocity the thickness of the air film increases and friction between the magnetic tape and tape engaging surface 32 of sleeve 28 decreases even further. Thus, as tape drive 20 drives reel 14 faster from the sufficient velocity up to a maximum velocity, for instance 11 meters per second, sleeve 28 will not rotate around shaft 30.

During motion stop down (i.e., deceleration) of magnetic tape 18, the tape engages tape engaging surface 32 of sleeve 28 once reel 14 is driven below the sufficient velocity, i.e., below a velocity of ½ meter per second. At this point, the thickness of the air film is not sufficient to separate magnetic tape 18 and tape engaging surface 32 of sleeve 28. Thus, magnetic tape 18 engages tape engaging surface 32 of sleeve 28 and the friction between the tape and the sleeve increases. Magnetic tape 18 then frictionally drives the sleeve around shaft 30 as the tape moves. Sleeve 28 starts rotating around shaft 30 because the friction between magnetic tape 18 and tape engaging surface 32 of sleeve 28 is greater than the friction between shaft engaging surface 34 of the sleeve and outer surface 36 of shaft 30.

As a result, magnetic tape 18 and sleeve 28 move together at the same velocity and there is no relative motion between them during motion stop down and there is no stiction. In effect, during motion stop down, tape guide 16a is dynamic and functions like a typical roller guide with all of the associated advantages thereof.

Thus it is apparent that there has been provided, in accordance with the present invention, a tape guide, a tape path, and a tape cartridge that fully satisfy the objects, aims, and advantages set forth above.

While the present invention has been described in conjunction with specific embodiments thereof, it is evident that many alternatives, modifications, and variations will be apparent to those skilled in the art in light of the foregoing description.

For example, the tape guide described herein could be used for flexible web guiding applications other than magnetic tape drives. Such applications include optical tape drives and film and fabric winding. Also, a tape path could include any number of tape guides as disclosed herein, as required for the application. The tape guides, reels, read/write heads, and other path components could be arranged in various configurations subject to the teachings herein. Accordingly, the present invention is intended to embrace all such alternatives, modifications, and variations as fall within the spirit and broad scope of the appended claims.

What is claimed is:

1. A tape guide comprising:

a fixed plastic shaft; and a cylindrical metal sleeve positioned around the shaft, the sleeve having an inner surface and an outer surface, the inner surface of the sleeve engaging the shaft such that there is a given amount of friction between the sleeve and the shaft, wherein the given amount of friction between the sleeve and the shaft is overcome by a given amount of friction between tape and the outer surface of the sleeve when the tape engages the outer surface of the sleeve causing the sleeve to rotate around the shaft as the tape starts to move, wherein the given amount of friction between the tape and the outer surface of the sleeve decreases below the given amount of friction between the sleeve and the shaft as the tape velocity increases causing the sleeve to cease rotating around the shaft.

2. The tape guide of claim 1 wherein:

the shaft has an outer surface with tapers and grooves.

3. A tape cartridge comprising:

a platform;

first and second rotatable reels mountable upon the platform;

tape having a first end wound upon the first rotatable reel and a second end wound upon the second rotatable reel; and a tape guide having a plastic shaft fixed to the platform and a cylindrical metal sleeve positioned around the shaft, the sleeve having an inner surface and an outer surface, the inner surface of the sleeve engaging the shaft such that there is a given amount of friction between the sleeve and the shaft, wherein the given amount of friction between the sleeve and the shaft is overcome by a given amount of friction between tape and the outer surface of the sleeve when the tape engages the outer surface of the sleeve causing the sleeve to rotate around the shaft as the tape starts to move, wherein the given amount of friction between the tape and the outer surface of the sleeve decreases below the given amount of friction between the sleeve and the shaft as the tape velocity increases causing the sleeve to cease rotating around the shaft.

4. A tape drive comprising:

means for mounting a tape cartridge, the tape cartridge including:

a platform;

first and second rotatable reels mountable upon the platform;

tape having a first end wound upon the first rotatable reel and a second end wound upon the second rotatable reel; and a tape guide having a plastic shaft fixed to the platform and a cylindrical metal sleeve positioned around the shaft, the sleeve having an inner surface and an outer surface, the inner surface of the sleeve engaging the shaft such that there is a given amount of friction between the sleeve and the shaft, wherein the given amount of friction between the sleeve and the shaft is overcome by a given amount of friction between tape and the outer surface of the sleeve when the tape engages the outer surface of the sleeve causing the sleeve to rotate around the shaft as the tape starts to move, wherein the given amount of friction between the tape and the outer surface of the sleeve decreases below the given amount of friction between the sleeve and the shaft as the tape velocity increases causing the sleeve to cease rotating around the shaft;

a read/write head mounted to be adjacent to the tape when the tape cartridge is mounted in the tape drive; and a controller for controllably rotating the first and second rotatable reels to advance the tape past the head, the controller coupled to the first and second rotatable reels when the tape cartridge is mounted in the tape drive, the controller further coupled to the read/write head for controllably operating the read/write head to write and read data from the tape.

* * * * *